Figure 1:
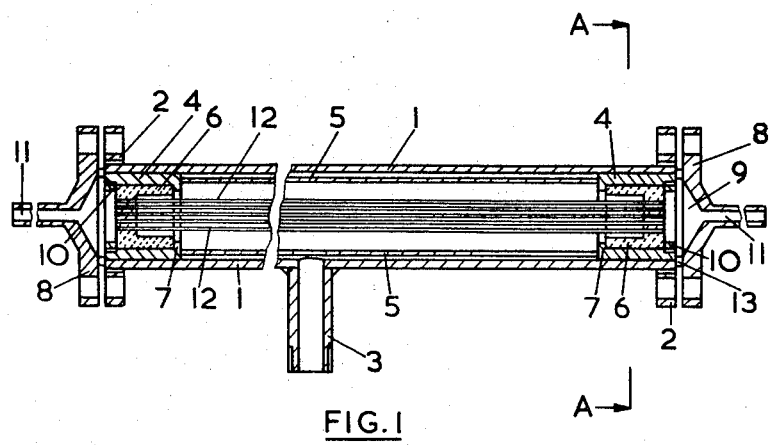

United States Patent
Porter et al.

[15] 3,674,744
[45] July 4, 1972

[54] POLYCONDENSATION IN POLY(TETRAFLUORETHYLENE) REACTOR

[72] Inventors: Kenneth Porter; Brian Richardson, both of Harrogate, England

[73] Assignee: Imperial Chemical Industries Limited, London, England

[22] Filed: Feb. 24, 1970

[21] Appl. No.: 13,727

[30] Foreign Application Priority Data

March 3, 1969 Great Britain.....................11,140/69

[52] U.S. Cl...............................260/75 M, 23/285, 260/78
[51] Int. Cl......................................C08g 17/01, C08g 20/24
[58] Field of Search................................................260/75 M Primary Examiner—Melvin Goldstein
Attorney—Cushman, Darby & Cushman

[57] ABSTRACT

A process for the preparation of a high molecular weight polymer by a condensation process of a liquid reaction mixture wherein at least one volatile by-product is eliminated, characterized in that said condensation process is carried out in apparatus of such form and so operated that said reaction mixture being subjected to the condensation process has no free surface and removal of volatile product or products from said reaction mixture is effected by diffusion through at least a proportion of the wall of said apparatus which is permeable to said volatile product or products but not permeable to said reaction mixture or said polymer, said proportion of the wall which is permeable serving to separate said reaction mixture from a chemically inert gaseous fluid in which the partial pressure of the volatile by-product, or of the volatile by-products, is continually maintained below the equilibrium partial pressure for the reaction mixture under the conditions of reaction.

4 Claims, 2 Drawing Figures

PATENTED JUL 4 1972　3,674,744

INVENTORS
KENNETH PORTER
BRIAN RICHARDSON
BY
Cushman, Darby & Cushman
ATTORNEYS

POLYCONDENSATION IN POLY(TETRAFLUORETHYLENE) REACTOR

The present invention relates to the preparation of high molecular weight condensation polymers.

Condensation polymers result from repeated intermolecular reaction between two reactive groupings one from each of two molecules with elimination of a low molecular weight byproduct, the molecules being difunctional in respect of the reactive groupings.

In such an elimination reaction it is necessary continually to remove the low molecular weight byproduct in order to facilitate completion of the reaction. The effecting of the reaction under conditions designed to ensure effective removal of the byproduct when reaction rate is high, particularly as the molecular weight of the polymer rises with resultant increase in viscosity, results in frothing. Such frothing has attendant undesirable features, for example it is possible for reaction mixture to be deposited on heated surfaces not continually subjected to flow of liquid reaction mixture, leading to overlong residence with consequent thermal decomposition.

According to the present invention we provide a process for the preparation of a high molecular weight polymer by a condensation process of a liquid reaction mixture wherein at least one volatile byproduct is eliminated, characterized in that said condensation process is carried out in apparatus of such form and so operated that said reaction mixture being subjected to the condensation process has no free surface and removal of volatile product or products from said reaction mixture is effected by diffusion through at least a proportion of the wall of said apparatus, which is permeable to said volatile product or products but not permeable to said reaction mixture or said polymer, said proportion of the wall which is permeable serving to separate said reaction mixture from a chemically inert gaseous fluid in which the partial pressure of the volatile byproduct, or of the volatile byproducts, is continually maintained below the equilibrium partial pressure for the reaction mixture under the conditions of reaction.

In the term "reaction mixture" we include any precursor compound or mixture of compounds which is, or are, commonly used as starting material or materials in the preparation of polycondensation polymers. Examples of such a reaction mixture are the product of the ester-interchange reaction of dimethyl terephthalate and ethylene glycol used in the preparation of poly(ethylene terephthalate), which is a mixture of oligomers, and hexamethylene diamine adipate used in the preparation of poly(hexamethylene diamine adipate).

The absence of free surface of the reaction mixture ensures that loss of volatiles from thin layers of liquid polymer does not occur in contact with heated walls resulting in stagnant layers of decomposing polymer with resultant periodical contamination of the mass of reaction mixture.

We have found a particularly advantageous substance from which the walls of the apparatus, or the proportion of the walls of the apparatus, which is to be permeable to the volatile product or products may be made is poly(tetrafluoroethylene). That available commercially is very suitable for this purpose.

We have now discovered a particularly advantageous method of carrying out such condensation reactions.

According to a preferential feature of the present invention we provide a process for the preparation of a high molecular weight polymer by a condensation process wherein at least one volatile byproduct is eliminated, characterized in that at least part of the reaction is carried out while the reaction mixture is in the liquid state and is separated by a body of poly(tetrafluoroethylene) from a chemically inert gaseous fluid in which the partial pressure of the volatile byproduct, or of the volatile byproducts, is continually maintained below the equilibrium partial pressure for the reaction mixture under the conditions of reaction.

Examples of condensation polymers appropriate for the process of our invention are polyesters, which may, for example, be prepared by the reaction of a dicarboxylic acid with a glycol, copolyesters, which may, for example, be prepared by the reaction of more than one dicarboxylic acid with at least one glycol, more than one glycol with at least one dicarboxylic acid, or a dicarboxylic acid, a hydroxymonocarboxylic acid and a glycol, polyamides, which may, for example, be prepared by the reaction of a dicarboxylic acid with a diamine and copolyamides, which may for example, be prepared by the reaction of more than one dicarboxylic acid with a diamine, more than one diamine with a dicarboxylic acid or a dicarboxylic acid, a diamine and an amino carboxylic acid.

By the expression "separated by a body of" we mean that the body is entire, that is the liquid mixture cannot pass through it. It is found, however, that the relatively low molecular weight by-products are able to pass through the poly(tetrafluoro ethylene) at a rate sufficiently high to provide a practicable reaction rate. A number of bodies may be associated spacially, for example a perforated metal plate may have its apertures filled with poly(tetrafluoroethylene) and permeation may take place through the various plugs of poly(tetrafluoro ethylene).

The liquid reaction mixture may be in continual movement with respect to the body of poly(tetrafluoroethylene). Thus, for example, the reaction mixture may be repeatedly exposed to the body of poly(tetrafluoroethylene) by agitation in a batch process or the reaction mixture may be moved over a succession of bodies of poly(tetraflyoroethylene) in a continuous process.

Advantageously the apparatus should be so constructed that stagnant bodies of reaction mixture are avoided, so as to avoid longer than average residence time of portions of the reaction mixture. Moreover, it should preferably be arranged that during a high proportion of its time in the apparatus the reaction mixture is in close proximity to the body of poly(tetraflyoroethylene). By this we mean that the time for which the reaction mixture is at a distance of greater than 20 thousandths of an inch away from the body of poly(tetrafluoroethylene) is largely wasted from the point of view of removal of the byproducts with furtherance of the reaction in the desired direction.

A particularly advantageous method of carrying out the reaction according to our invention is that in which the body of poly (tetrafluoroethylene) is in the form of a tube. The reaction mixture may either be forced through the bore of the tube while inert fluid is in contact with the outside wall of the tube, or the reaction mixture may be moved over the outside wall of the tube while inert fluid flows through the bore of the tube. A plurality of tubes may, of course, be arranged in close proximity and with mainfolds so as to be operating in parallel thus allowing a relatively large throughput of reaction mixture. Preferably in the case wherein the reaction mixture flows through the bore of the tube the internal diameter of the tube should be from 1 to 20 thousandths of an inch. In the case wherein the reaction mixture flows over the outside wall of the tube the tubes should be so arranged in relation to each other and so enclosed by the surrounding walls of the apparatus that for a major proportion of its residence time in the apparatus the reaction mixture is within 10 thousandths of an inch of an outside wall of a tube.

The chemically inert gaseous fluid from which the reaction mixture is separated may be at atmospheric pressure or may be above or below atmospheric pressure, including what is commonly referred to as vacuum. The partial pressure of the byproduct, or byproducts, in the inert gaseous fluid may be regulated by, for example, condensation of the byproduct, or byproducts, against a cold surface and removal from the system as liquid or continual replacement of the inert gaseous fluid.

The rate of permeation of the byproduct, or byproducts, through the body of poly(tetrafluoroethylene) is facilitated by minimizing the distance through which it has to permeate. The thickness of poly(tetrafluoroethylene) separating the liquid reaction mixture from the inert gaseous fluid should therefore be minimized. Preferably the length of path through the poly(tetrafluoroethylene) should not exceed 15 thousandths of an inch. With small thickness of poly(tetrafluoroethylene) it may be advantageous to provide mechanical strength by the proximity of a suitable member. For example, a porous tube may be impregnated with poly(tetrafluoroethylene) so that the pores are filled and the resultant tube used to separate a liquid reaction mixture for condensation polymer formation in contact with the outside of the tube from an inert gaseous fluid flowing through the tube. A multiplicity of such tubes may be arranged, for example in parallel, in A single apparatus, such tubes being of small outside diameter and suitably arranged so that, while liquid reaction mixture can flow freely over the outside surface of the tubes maximum tube surface is provided for a given reactor volume.

A suitable range of temperature over which the process of our invention may be carried out is 120°–320° C. although, as stated hereinbefore, the reaction will be carried out at a temperature at which the particular reaction mixture is liquid. At temperatures above 250° C. it is desirable that the poly (tetrafluoroethylene) be supported to provide adequate mechanical strength.

A condensation polymerization may be optionally speeded up by the use of any catalyst or mixture of catalysts known for use in the polymerization. Other chemically inert substances may also be present during the reaction. Examples of such substances are antioxidants, stabilizers, delustrants, dispersing agents and optical brighteners.

In order that the process of our invention may the more fully be understood, we give hereinafter examples of particular modes of carrying it out. In these examples all parts and percentages are by weight.

EXAMPLE 1

Dimethyl terephthalate (100 parts) and ethylene glycol (71 parts) were reacted together under ester interchange conditions using manganous acetate (0.05 per cent based on dimethyl terephthalate) until the theoretically obtainable quantity of methanol had been evolved, addition of phosphorous acid (0.037 percent based on dimethyl terephthalate) and antimony trioxide (0.06 percent based on dimethyl terephthalate). A reaction cell was prepared by sandwiching an annular aluminum gasket 0.012 inches thick, 2 inches internal diameter and 2.5 inches external diameter between poly(tetrafluoroethylene) sheets 0.002 inches thick and of 2.5 inches diameter this assembly was in turn sandwiched between two sintered bronze plates of one eighth inch thickness and of 4 inches diameter with inter-position of annular aluminum gaskets of the same dimensions as that already described between the poly(tetrafluoroethylene) and the sintered bronze. The sintered bronze plates were urged towards each other by means of bolts and nuts passing through holes bored near the outer edges and suitably disposed, so as to maintain a gas-tight seal between the poly (tetrafluoroethylene) and the central aluminum gasket thus forming a gas-tight cell 0.012 inches thick and 2 inches diameter. Into this cell before completion of assembly there was introduced the ester-interchange reaction product. The cell assembly was then placed in a sand bath fluidized with oxygen free nitrogen at 280° C. in such manner that there was full access of the nitrogen to the external surface of each poly(tetrafluoroethylene) sheet. The sand bath was maintained at 280° C. for 1½ hours after which the cell assembly, was removed and allowed to cool. On opening the cell assembly, the solidified poly(ethylene terephthalate), which separated easily from the constituent parts of the cell assembly, was found to be of Viscosity Ratio 1.583 as measured at 1 percent weight/volume in orthochlorophenol at 25° C.

EXAMPLES 2, 3 and 4

Example 1 was repeated with the only distinction that in place of the product of the esterinterchange reaction, hexamethylene diamine adipate was charged to the reactor. The reaction was repeated three times. The values for Viscosity Ratio for the three examples were as follows:

| Example | Viscosity Ratio |
| --- | --- |
| 1 | 10.3 |
| 2 | 13.7 |
| 3 | 16.5 |

EXAMPLE 5

Figure 2:
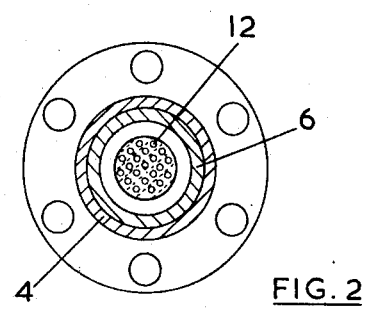

An alternative apparatus is depicted in FIGS. 1 and 2 in which FIG. 1 shows a sectional view of a multiple tube carrier.

FIG. 2 shows a section through A — $A_1$ of one of the tube plates (6).

In FIG. 1 only 5 tubes are shown for simplicity and in FIG. 2 only 21 tube sections are shown.

Referring to FIGS. 1 and 2, the carrier body (1) consists of a pipe of mild steel of 20 inches total length, 2 inches external diameter and one and five eighths inches internal diameter and bearing a flange (2) flush with each end. A tube (3) is let into the carrier body (1) and communicates with its interior. A bush of mild steel (4) is a close sliding fit into each end of the carrier body (1). Distance pieces of mild steel (5) facilitate assembly and consist of halves together constituting a tube 17 inches in length. Tube plates (6) are a close sliding fit into each of the bushes (4) and abut against a lip (7) when assembled. The external diameter of a tube plate (6) is 1.24 inches; the internal diameter is 0.9 inches; the overall length is 1.14 inches; the actual plate is 0.375 inches thick. A collection chamber is formed from a circular end cover (8) with conical center portion (9) and the center of a ring (10) which screws into a thread in the bush (4) and retains the tube plate (6). The conical center portion (9) communicates with a tube (11). Each of the tube plates (6) is bored with 299 equally spaced holes, each hole being of size to take with a close fit a poly(tetrafluoroethylene) tube (12) of 0.015 inches internal diameter and of 0.008 inches wall thickness. The tubes (12) were each of 20 inches free length when assembled and were of normal commercially available type supplied by Polypenco Co. Ltd. of Welwyn Garden City. Before use, the poly(tetrafluoroethylene) tubing was tested for pin holes by testing leakage to earth through the walls using a high frequency supply at about 300 Kc. per second. Tubing failing the test was rejected. The multiple tube carrier is assembled by first threading one end of each poly(tetrafluoroethylene) tube (12) through a hole in one of the tube plates (6), which are made oversize in order to allow for subsequent shrinkage in the process of assembly and turning down to size. A stainless steel wire, which forms a push in fit, is inserted into the open end of each tube (12) and this assembly raised to a temperature of 390° C. and maintained thereat for 2 hours to effect sintering to form a liquid tight seal between the tubes (12) and the tube plate (6). The tube plate is then turned down to the finished diameter (1.24 inches) and the bush (4) fitted onto it. The free ends of the tubes (12) are threaded through the second bush (4) and the free end of each tube (12) threaded through a hole in the second tube plate (6) and the sintering, turning down to size and fitting of the bush (4) around the tube plate (6) carried out as described for the first tube plate (6). The distance pieces (5) are placed around the tubes (12) and this assembly inserted into the carrier body (1), the rings (10) screwed into the bushes (4) and the end covers (8) bolted to the flanges (2) with inclusion of a gasket (13) of aluminum.

In operation, the multiple tube carrier was raised to a temperature of 285° C. by enclosure in a close fitting, heated, aluminum block of 6 inches diameter and 25 inches long, and that temperature was maintained during the carrying out of the reaction. Poly(ethylene terephthalate) of intrinsic viscosity 0.27, as measured in orthochlorophenol at a concentration of 1 g per 100 ml. at 25° C., was prepared according to the known method involving the reaction of terephthalic acid with ethylene glycol, addition of phosphorous acid at a level of 0.01 percent by weight based on the terephthalic acid, addition of antimony trioxide as polycondensation catalyst at a level of 0.05 percent by weight based on the terephthalic acid and titanium dioxide as delustrant at a level such as would give a content of 0.5 percent by weight on the high molecular weight poly(ethylene terephthalate), and subjecting to polycondensation conditions. The poly(ethylene terephthalate) of intrinsic viscosity 0.27 was pumped as molten material at a temperature 285° C. through one of the tubes (11) at a rate of 0.4 g. per minute. The molten poly(ethylene terephthalate) filled the first collecting chamber, flowed through the poly(tetrafluoroethylene) tubes (12), from thence was collected in the second collecting chamber and flowed out through the second tube (11). The interstices between the tubes (12) were reduced to a pressure of <1 mm. of mercury by way of the tube (3). The calculated residence time of the poly(ethylene terephthalate) in a poly(tetrafluoroethylene) tube was 48 minutes. The intrinsic viscosity of the poly(ethylene terephthalate) leaving the multiple tube carrier was 0.438, that is of fiber-forming molecular weight.

What we claim is:

1. In a process for the preparation of a high molecular weight polyethylene terephthalate by a condensation process wherein at least one volatile by product is eliminated, the improvement which comprises carrying out the reaction while the reaction mixture is in the liquid state and is separated by a body of poly(tetrafluoroethylene) from a chemically inert gaseous fluid in which the partial pressure of volatile by product is continually maintained below the equilibrium partial pressure for the reaction mixture under the conditions of reaction.

2. A process according to claim 1 wherein the reaction mixture is in continual motion relative to the poly(tetrafluoroethylene) surface.

3. A process according to claim 1 wherein the path of the byproducts through the poly(tetrafluoroethylene) from the reaction mixture to the inert gaseous fluid is no longer than 15 thousandths of an inch.

4. A process according to claim 1 wherein the poly(tetrafluoroethylene) is in the form of a tube or tubes and the reaction mixture flows through the tube or tubes with the inert gaseous fluid outside of the tube or tubes, or the reaction mixture flows over the outside of the tube or tubes with the inert gaseous fluid flowing through the tube or tubes.

* * * * *